United States Patent [19]

Kondo et al.

[11] Patent Number: 4,861,974
[45] Date of Patent: Aug. 29, 1989

[54] CARD READER

[75] Inventors: Takayuki Kondo, Ootsu; Muneki Morishita, Takatsuki, both of Japan

[73] Assignee: Omron Tateisi Electronics Co., Kyoto, Japan

[21] Appl. No.: 254,596

[22] Filed: Oct. 7, 1988

[30] Foreign Application Priority Data

Oct. 13, 1987 [JP] Japan .......................... 62-156509[U]

[51] Int. Cl.⁴ .............................................. G06K 13/00
[52] U.S. Cl. ..................................... 235/475; 235/485; 235/449
[58] Field of Search ..................... 235/475, 485, 449

[56] References Cited

U.S. PATENT DOCUMENTS 3,015,087 12/1961 O'Gorman ........................... 235/485
3,836,753 9/1974 Pass ..................................... 235/449
4,170,348 10/1979 Hoeink et al. ...................... 271/240

Primary Examiner—Harold F. Pitts
Attorney, Agent, or Firm—Stevens, Davis, Miller & Mosher

[57] ABSTRACT

A card conveying appartaus is arranged between the right and left frames. A card one-sided setting member is swingably attached to one of the frames. This card one-sided setting member is obliquely held by a spring toward the side of the other frame. When a card is conveyed by the conveying apparatus, the card is pressed to the side of the other frame by the one-sided setting member, so that the position is restricted. The one-sided setting member is returned to the side of one frame by the card. The returned one-sided setting member is detected by one sensor. A detection signal of this sensor functions as a card detection signal indicating that the card is being conveyed.

2 Claims, 6 Drawing Sheets

CARD READER

BACKGROUND OF THE INVENTION

The present invention relates to a card reader for reading data recorded on/in cards including a magnetic card having a magnetic stripe or magnetic surface, an IC card having therein a memory or IC such as a CPU or the like, an optical card from which data can be optically read out, and the like and, if necessary, for writing data to the card. The card reader is built in an apparatus for handling cards, for instance, an automatic transaction processing machine (e.g., automated teller machine or the like) to handle bank cards.

As shown in FIGS. 5 and 6, in a conventional motor driven card reader for reading or writing card data, in the case of conveying a magnetic card A by a card conveying apparatus 23 comprising upper and lower conveying rollers 28 and 29 arranged between a main frame 21 and a subframe 22, the magnetic card A is pressed to the side of the main frame 21 by a card one-sided setting plate 25 so that a magnetic head 24 can accurately read or write the card data.

The card one-sided setting plate 25 is pivotably supported at the upper edge portion thereof to the subframe 22 via a fulcrum shaft 26 and one side portion of the magnetic card A which passes between the upper and lower conveying rollers 28 and 29 is pressed by a spring member 27 on the lower edge side.

The card reader needs a plurality of (in the diagram, five) sensors 30a to 30e to detect that the magnetic card A is located in the apparatus. The sensors 30a to 30e are arranged in the longitudinal direction (card conveying direction) of the card conveying path at a pitch interval shorter than the length of card. The sensors 30a to 30e detect the card independently of the motion of the card one-sided setting plate 25. The card A is inserted from the side of the sensor 30a and ejected out to the side of the sensor 30e.

FIG. 7 shows an operation flowchart of the foregoing conventional card reader. In the standby mode, the card one-sided setting plate 25 is pressed by the spring member 27. All of the sensors 30a to 30e are in the OFF state (inoperative mode). When the magnetic card A is inserted, the card one-sided setting plate 25 is returned to the subframe side by the card A against the spring force of the spring member 27. When the inserted card is detected by the sensor 30a (step S11), a motor (not shown) of the conveying apparatus 23 rotates in response to a detection signal of the sensor 30a, so that the rollers 28 and 29 are driven to thereby convey the card A (step S12).

The sensors 30a to 30e are sequentially turned on by the conveyed magnetic card A (steps S13, S14). When either one of the sensors 30a to 30e has been turned on, a control unit (not shown) recognizes that the magnetic card exists in the card reader.

On the other hand, card magnetic data is read or written by the magnetic head 24 during the conveyance of the card. A reading or writing timing is determined by a detection signal of the third sensor 30c.

When the magnetic card A is ejected by the apparatus and the last fifth sensor 30e is turned off, the motor is stopped (steps S15, S16).

As mentioned above, according to such a conventional structure, the state of the card needs to be always checked by using a plurality of sensors in order to detect the presence of the card. This is because if only the two first and fifth sensors 30a and 30e arranged on the inlet and outlet ports of the apparatus are used to control, the presence or absence of the card cannot be accurately detected in the case of the abnormal operation (for instance, when a power supply is shut off or the card is pulled out immediately after it was inserted, or the like).

It is, therefore, necessary to use many sensors in the conventional card reader. There are problems such that the number of parts of the apparatus increases and the degree of freedom in designing of the conveying system such as the card one-sided setting plate or the like is small.

SUMMARY OF THE INVENTION

It is an object of the invention to provide a card reader which can detect the presence or absence of a card in the card reader by merely detecting the motion of a card one-sided setting member by using a single sensor.

According to the present invention, this object is accomplished by a card reader comprising: a card conveying apparatus arranged between right and left frames; a one-sided setting member, swingably supported on one of the frames, for pressing a card which is conveyed by the conveying apparatus to the other frame and thereby restricting the position of the card, this one-sided setting member having a spring and being pressed toward the other frame side by this spring so as to be set into an oblique attitude; and a sensor for detecting a part of the one-sided setting member and outputting a card detection signal when the one-sided setting member is returned to one frame side against a spring force of the spring by the card which is conveyed by the conveying apparatus.

The one-sided setting member has a portion which extends in a predetermined range in the card conveying direction. Preferably, a card guide groove is formed in this portion in the card conveying direction.

When the card is conveyed by the conveying apparatus, the card is pressed to the other frame side by the one-sided setting member, so that the position of the card is restricted. Thus, data can be accurately written into or read out from the card. The one-sided setting member is returned to one frame side by the card conveyed. The returned one-sided setting member is detected by one sensor. A detection signal of this sensor functions as a card detection signal indicating that the card is being conveyed. That is, the motion of the one-sided setting member itself for setting the position of the card which passes through the card conveying path is detected by the sensor, thereby enabling the presence or absence of the card in the card reader to be recognized for the whole card conveying path.

Consequently, the invention can provide the following advantages.

Even when the card is located at any position in the card reader, it can be detected by one sensor and the number of sensors can be reduced.

In association with the decrease in number of sensors, the number of substrate to install the sensors can be reduced and the size thereof can be also reduced.

The degree of freedom in designing of the conveying system such as a card one-sided setting member or the like increases.

BRIEF DESCRIPTION OF THE DRAWINGS

FIGS. 2 and 3 are operation explanatory diagrams in a cross sectional view taken along the line I—I in FIG. 1, in which FIG. 2 shows a state in which no card exists and FIG. 3 shows a card conveying state, respectively;

DETAILED DESCRIPTION OF A PREFERRED EMBODIMENT

Figure 1:
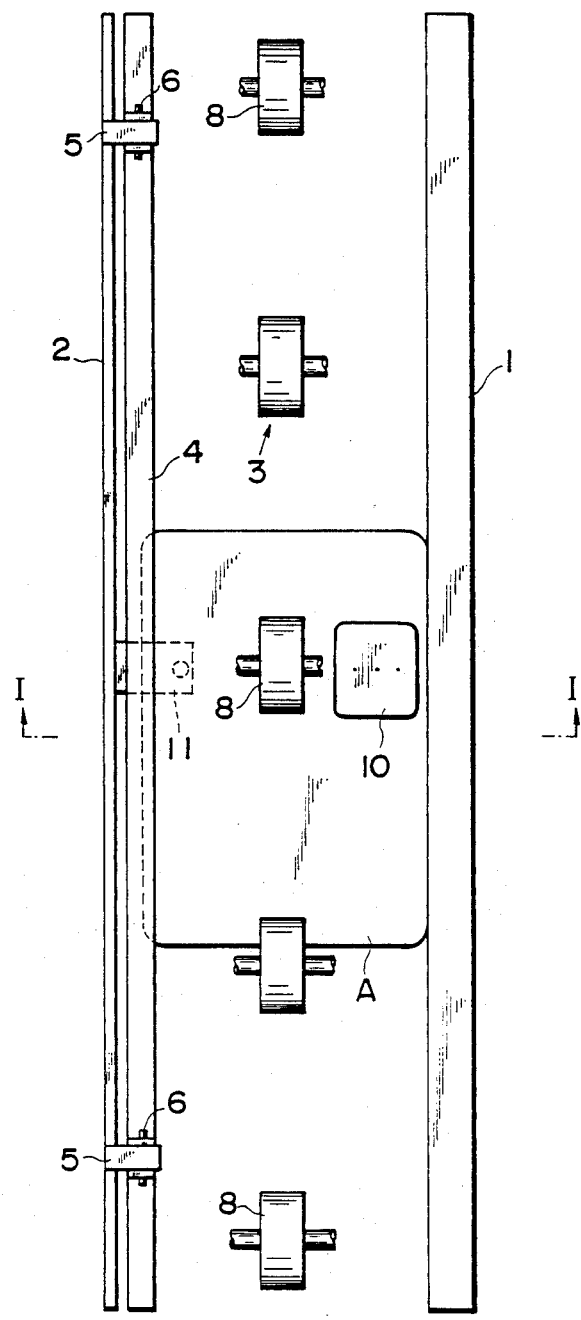
FIG. 1 is a plan view of a card reader of an embodiment of the present invention.
Figure 2:
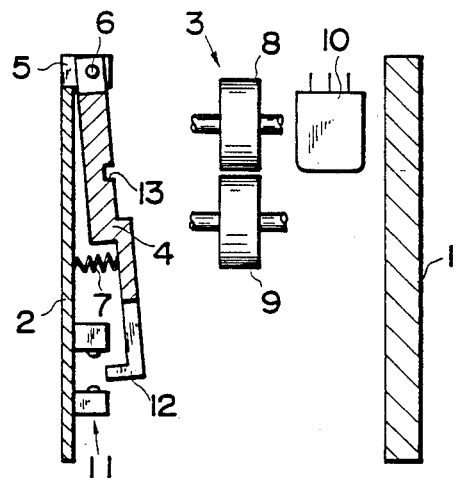
Figure 3:
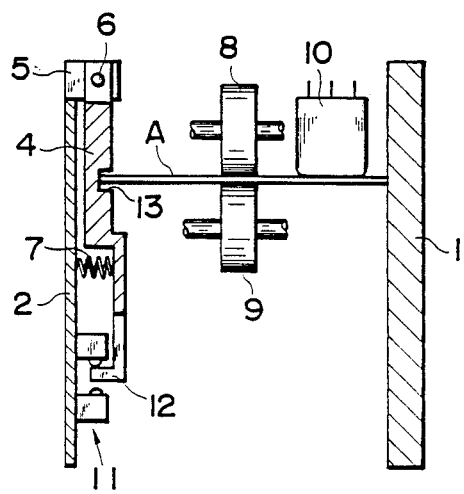

FIGS. 1 to 3 are arrangement diagrams of a motor driven card reader. A card conveying apparatus 3 is arranged between a main frame 1 and a subframe 2. A card one-sided setting plate 4 is pivotally supported to the side of the subframe 2.

The card conveying apparatus 3 comprises a plurality of upper and lower conveying rollers 8 and 9 arranged in the longitudinal direction of the frames 1 and 2 at the center between the frames 1 and 2. The conveying rollers 8 and 9 are driven by a drive motor (not shown). Upper and lower conveying belts may be also reeved around the conveying rollers 8 and 9, respectively.

Brackets 5 are provided in both edge portions at the upper portion of the subframe 2. The card one-sided setting plate 4 is rotatable by being supported to the brackets 5 at the upper projecting portion of the plate 4 by fulcrum shafts 6. The card one-sided setting plate 4 is formed like an elongated longitudinal shape along the subframe 2. A groove 13 to guide the side edge portion of the magnetic card A is formed on the surface of the card one-sided setting plate 4 on the side of the main frame 1. The groove 13 extends in the card conveying direction. A plurality of spring members 7 to press the plate 4 to the side of the main frame 1 around the fulcrum shafts 6 as rotational centers are attached at proper positions between the subframe 2 and the plate 4.

The magentic card A is sandwiched by the upper and lower conveying rollers 8 and 9 of the card conveying apparatus 3 and conveyed. A magnetic head 10 is arranged at a proper position on the way of the conveying path. The magnetic head 10 is fixed to the main frame 1 by a supporting member (not shown).

A sensor 11 such as a photoelectric sensor is attached to the subframe 2 in correspondence to the attaching position of the magnetic head 10. A bent portion 12 which extends downwardly from the corresponding portion of the card one-sided setting plate 4 and progresses (ON) toward the sensor 11 by the rotation of the plate 4 and is pulled out (OFF) therefrom.

The sensor 11 detects the conveyed magnetic card A. On the basis of this detection signal, the timing to read or write the card magnetic data by the magnetic head 10 is determined.

Figure 4:
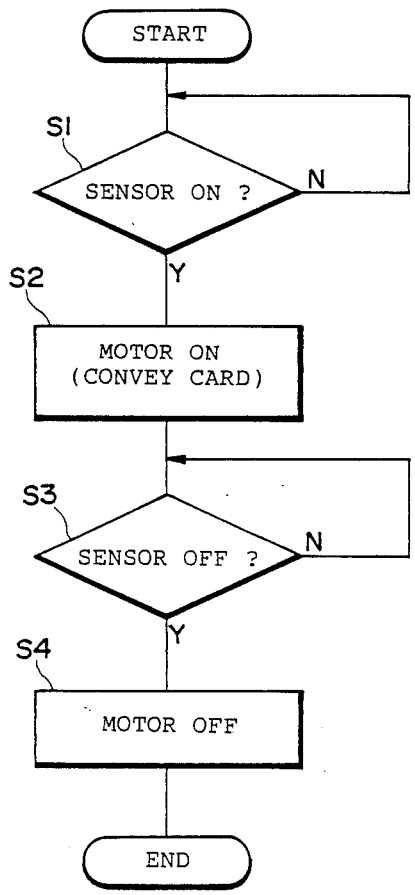
FIG. 4 is a flowchart showing the operation of a card reader in the embodiment.
Figure 5:
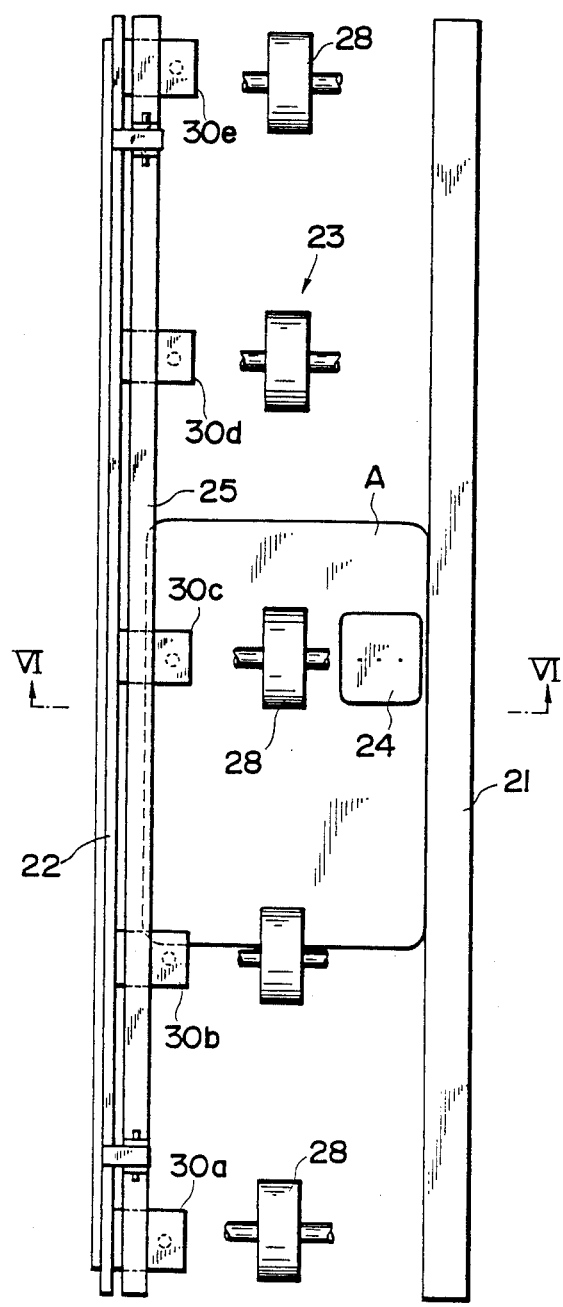
FIG. 5 is a plan view of a conventional card reader.
Figure 6:
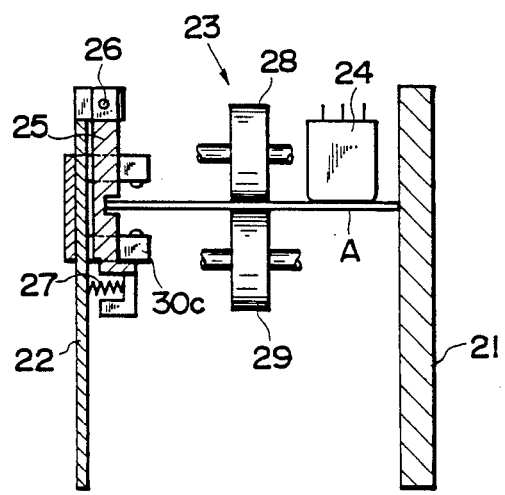
FIG. 6 is a cross sectional view taken along the like VI—VI in FIG. 5.
Figure 7:
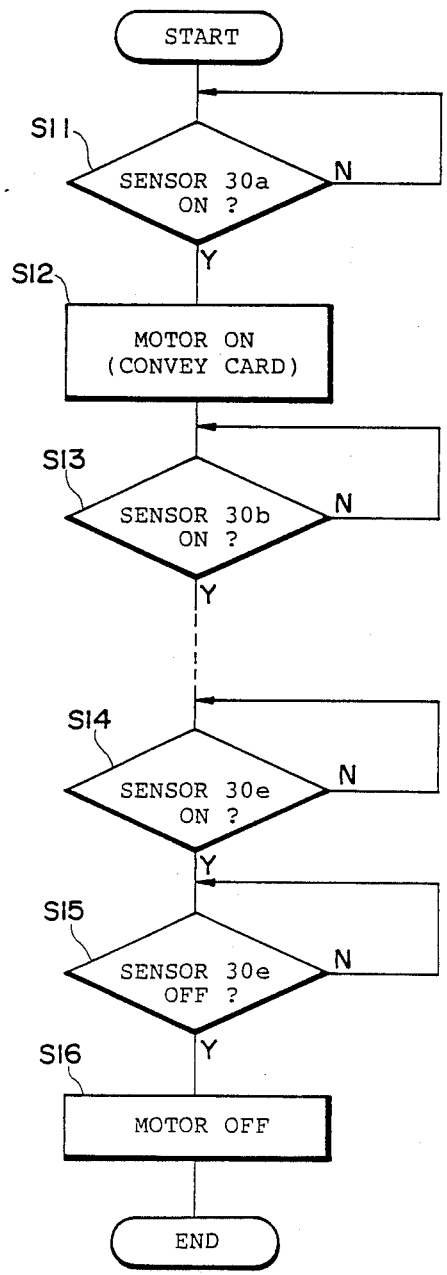
FIG. 7 is an operation flowchart of a conventional card reader.

The operation of the card reader constructed as explained above will now be described with reference to a flowchart of FIG. 4.

When no card is inserted, as shown in FIG. 2, the card one-sided setting plate 4 is pushed out to the side of the main frame 1 by the spring members 7, so that the bent portion 12 of the plate 4 is away from the sensor 11 and the sensor 11 is set to the inoperative mode.

When the magnetic card A is inserted, as shown in FIG. 3, the card one-sided setting plate 4 is moved backward by the inserted card A against the spring force of the spring members 7 and, at the same time, the card A is deviated to one side by the reaction by using the main frame 1 as a reference. The bent portion 12 of the plate 4 is simultaneously inserted to the sensor 11, so that the sensor 11 is turned on (step S1).

Thus, the motor of the conveying apparatus is driven to convey the card (step S2).

During the conveyance of the card, a check is made by a control unit (not shown) to see if the magnetic card A exists in the card reader or not by discriminating whether the sensor 11 is always ON or not. On the other hand, during the conveyance of the card, card magnetic data is read or written by the magnetic head 10.

When the magnetic card A is away from the card conveying apparatus 3 and the card one-sided setting plate 4 is returned to the state of FIG. 2, the sensor 11 is turned off and the motor stops and the processing routine is finished (steps S3 and S4).

By checking the motion of the plate 4 in this manner, one sensor 11 detects the existence of the magnetic card A for the interval from the inlet to the outlet of the card conveying apparatus 3. Thus, the structure is extremely simplified and the degree of freedom in designing of the conveying system of the card one-sided setting plate 4 or the like increases.

What is claimed is:

1. A card reader comprising:
   a card conveying apparatus arranged between right and left frames;
   a one-sided setting member, swingably supported to one of said frames, for pressing a card which is conveyed by said conveying apparatus to the other frame and thereby restricting the position of the card, said one-sided setting member having a spring and being pressed toward the side of the other frame by said spring so as to be set to an oblique attitude; and
   a sensor for detecting a portion of said one-sided setting member and outputting a card detection signal when the one-sided setting member is returned to the side of one frame against a pressing force of said spring by the card which is conveyed by the conveying apparatus.

2. A card reader according to claim 1, wherein said one-sided setting member has a portion which extends in a predetermined range in a card conveying direction, and a card guide groove is formed in this portion in the card conveying direction.

* * * * *